United States Patent [19]

Toyono et al.

[11] Patent Number: 4,739,415
[45] Date of Patent: Apr. 19, 1988

[54] IMAGE HANDLING SYSTEM CAPABLE OF VARYING THE SIZE OF A RECORDED IMAGE

[75] Inventors: Tsutomu Toyono; Hisashi Fukushima; Yoshihiro Takada, all of Yokohama, Japan

[73] Assignee: Canon Kabushiki Kaisha, Tokyo, Japan

[21] Appl. No.: 42,628

[22] Filed: Apr. 23, 1987

Related U.S. Application Data

[63] Continuation of Ser. No. 727,858, Apr. 29, 1985, abandoned.

[30] Foreign Application Priority Data

May 1, 1984 [JP] Japan ................................. 59-88062
May 4, 1984 [JP] Japan ................................. 59-88413
May 7, 1984 [JP] Japan ................................. 59-89383

[51] Int. Cl.⁴ ...................... H04N 1/23; H04N 1/393; G01D 15/16
[52] U.S. Cl. ............................... 358/296; 346/140 R; 358/287
[58] Field of Search ....................... 346/140, 75, 33 R; 358/287, 296, 298

[56] References Cited

U.S. PATENT DOCUMENTS

| | | | |
|---|---|---|---|
| 2,951,894 | 9/1960 | Hirsch | 346/140 X |
| 4,003,061 | 1/1977 | LaCanfora | 346/108 X |
| 4,268,870 | 5/1981 | Kitamura | 358/293 X |
| 4,319,283 | 3/1982 | Ozawa | 358/296 X |
| 4,323,919 | 4/1982 | Fujii et al. | 358/75 |
| 4,393,387 | 7/1983 | Kitamura | 346/108 |
| 4,408,907 | 10/1983 | Bernardis | 400/124 |
| 4,513,299 | 4/1985 | Lee | 346/140 |

FOREIGN PATENT DOCUMENTS

31421 8/1981 European Pat. Off. .

Primary Examiner—Joseph W. Hartary
Attorney, Agent, or Firm—Fitzpatrick, Cella, Harper & Scinto

[57] ABSTRACT

An image handling system with a variable magnification function can form a high-quality image at all times. The system sets a relative movement distance or speed between a recording head and a recording material and then determines a recording pixel area according to the set variation ratio in the relative movement distance or speed.

26 Claims, 9 Drawing Sheets

IMAGE HANDLING SYSTEM CAPABLE OF VARYING THE SIZE OF A RECORDED IMAGE

This application is a continuation of application Ser. No. 727,858 filed Apr. 29, 1985, now abandoned.

BACKGROUND OF THE INVENTION

1. Field of the Invention

The present invention relates to an image handling system and more particularly to a variable image-magnifying apparatus and an image forming apparatus using a scanning type recording system.

2. Description of the Prior Art

Figure 1:
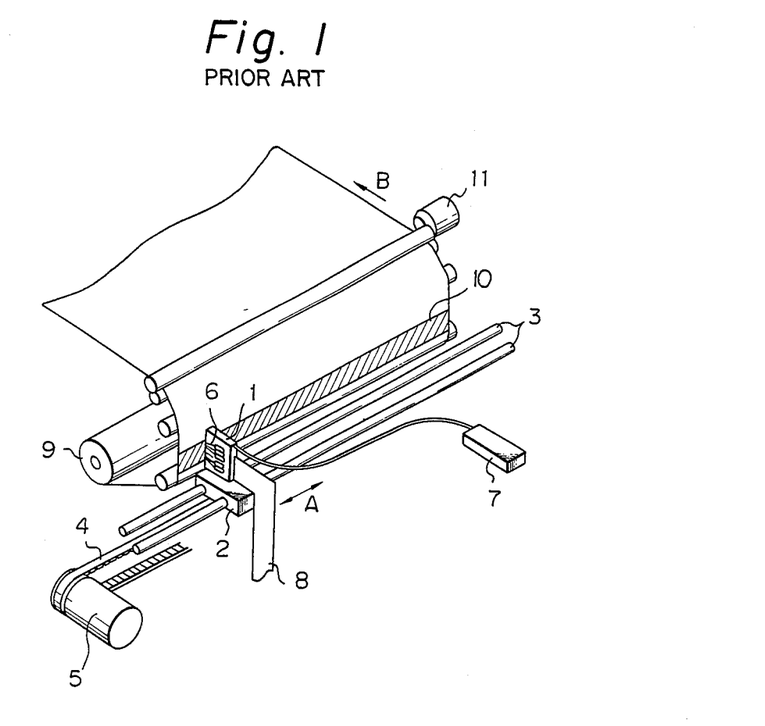
FIG. 1 is a perspective view of the main construction of a prior art recording apparatus.

FIG. 1 shows a main construction of one prior art recording apparatus. In the figure, a recording head 1 mounted upon a recording head carriage 2 is disposed to be movable on a main scanning guide rail 3 the direction of arrow A. The recording head carriage 2 is moved by a timing belt 4 driven with a drive source such as a pulse motor 5. The recording head 1 is provided with a plurality of nozzles 6 to which ink from an ink tank 7 is supplied, an input with a recording signal from a read-out device via a signal line 8 to thereby move in the main scanning direction while jetting out ink drops. The ink drops are recorded onto a recording paper 9 disposed facing the recording head 1. Numeral 10 represents a width capable of being printed out with a single main scanning. After completion of a single main scanning and return to the start position, a sub-scanning movement in the direction of arrow B, corresponding in amount to the print width 10, is effected by a drive source 11 such as a sub-scanning pulse motor. Succeedingly, the operation for the next main scanning is again repeated, thus printing out the whole image region.

In order to perform a variable magnification with the apparatus of this kind, generally a thinning system is used in a scale reduction mode in order to thin input pixel signals in accordance with a scale reduction ratio. In particular, assuming that 1 mm of the image is printed out by 8 dot/mm in an equal magnification mode, if the image is to be reduced by ½, every second dot of the 8 dot signal is thinned, that is, 4 dots are thinned, thereby obtaining a 0.5 mm image from a 1 mm image in equal magnification. Contrary to the above, in a scale magnification mode, e.g. a double-size mode, an interpolation system is used wherein two dots are printed out for each dot of the image signal in the equal magnification mode. Upon using such system, since the original image signal is thinned in the scale reduction mode, the amount of information is reduced and hence the printed image quality is signficantly deteriorated. Furthermore, in the scale reduction and magnification modes using the serial scan type apparatus such as shown in FIG. 1, since the image width varies with the magnification ratio at a time irrespective of the constant number of printing nozzles of the recording head, signal processing becomes very much complicated. In particular, it is assumed that the head 1 has 32 nozzles and hence the information amount corresponds to 32 dots in the equal magnification mode In a ½ scale reduction mode, the information amount is compressed to that corresponding to 16 nozzles in the head. Therefore, if all of the 32 nozzles are to be used, then the information amount becomes that corresponding to 64 dots as of the equal magnification mode. Alternatively, in the twice-size mode, the information amount in 32 dots of the equal magnification mode can not be sufficiently processed with the 32 nozzles of the head. That is, the output amount obtainable at one time with the 32 nozzles of the head corresponds to the information amount in 16 dots of the equal magnification mode. As above described, it is necessary to control the information amount capable of being output at one time for each scale reduction, equal magnification, and magnification mode. Thus, there arises a problem that the signal processing circuitry for such control becomes complicated.

Figure 2:
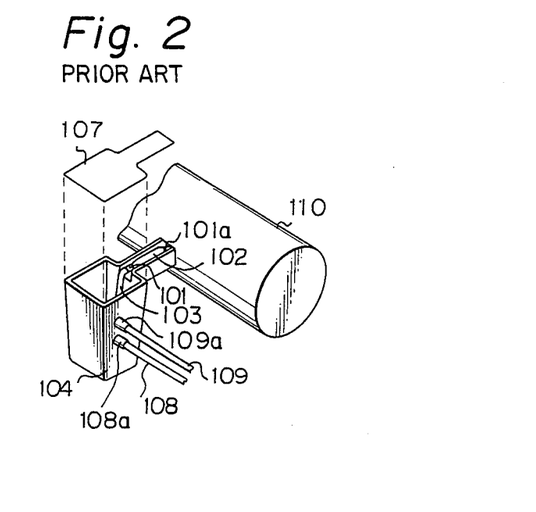
FIG. 2 is a perspective view of an outline of a structure of a prior art ink jet printer.
Figure 3:
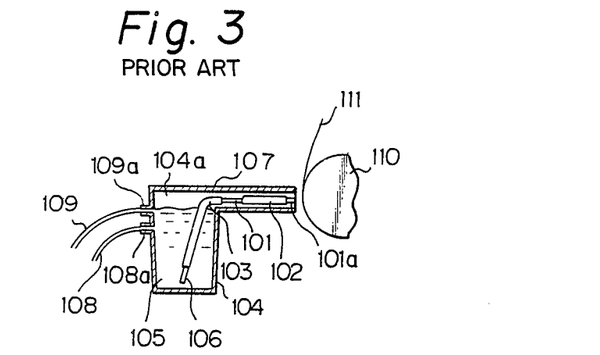

One example of the structure of a prior art ink jet printer with a single color output is shown in FIGS. 2 and 3. Represented by numeral 101 is an ink jet nozzle made of glass tube about which a piezoelectric element 102 is engaged. The tip portion of the ink jet nozzle 101 is squeezed to form a nozzle 101a, while the end portion is coupled to one end of a tube 103. The other end of the tube 103 is immersed into ink 105 in a sub-ink tank 104. The lower end portion of the tube 103 is provided with a filter 106. On the upper side of the sub-ink tank 104, a lid 107 is fixedly mounted so that the sub-ink tank 104 as a whole is hermetically constructed. An air layer 104a having a predetermined space is formed within the sub-ink tank 104 at its upper portion.

A joint portion 108a of the sub-ink tank 104 is coupled to one end of a flexible tube 108, while the other end thereof is coupled to a not shown main ink tank. Another joint portion 109a is formed above the joint portion 108a connecting the flexible tube 108. The joint portion 109a is coupled to one end of a ink suction tube 109, while the other end thereof is coupled to a not shown negative pressure source.

The ink jet nozzle 101 and sub-ink tank 104 constructed as above are mounted on a not shown carriage and disposed facing a platen 110. The piezoelectric element 102 is compressed by energizing it in response to a control signal, thereby jetting out ink from the ink jet nozzle 101. Thus, a printing paper 11 fed in contact with the platen 110 can be printed out.

Figure 4A:
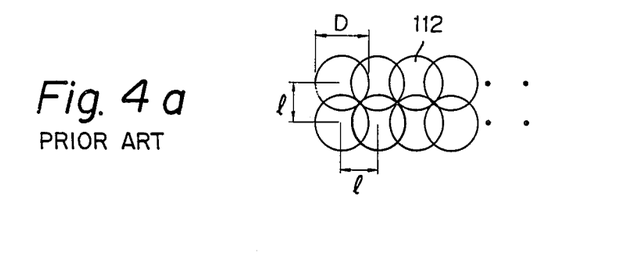
FIG. 4(a) is a view for explaining the printed example in a standard mode.
Figure 4B:
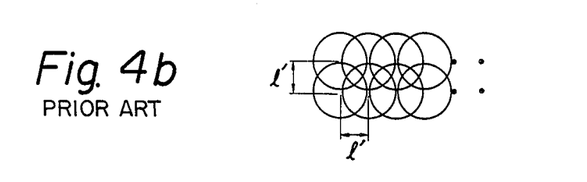
FIG. 4(b) is a view for explaining the printed example in a scale reduction mode.
Figure 4C:
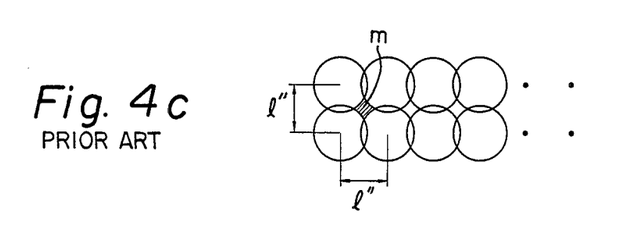
FIG. 4(c) is a view for explaining the printed example in a magnification mode.

An example of printed dots obtained through the above operations is shown in FIG. 4(a). In the figure, the pitch l between the printed dots 112 is determined considering the relation between the energization frequency for the piezoelectric element 102 shown in FIGS. 2 and 3 and a feed speed (hereinafter called as main scanning speed) of the carriage mounting such as the jet nozzle 101. The dot diameter D of an ink drop is set for example as $D = \sqrt{2}l$ so as not to make any clearance between the printed dots as shown in the dot disposal of FIG. 4(a). After completion of printing out the first line, the platen 110 shown in FIGS. 2 and 3 rotates to feed the recording paper 111 disposed between the platen 110 and the ink jet nozzle 101 by the distance in the direction perpendicular to the main scanning direction (hereinafter called as sub-scanning direction). The above operations are repeated to print out the overall image area on the recording paper 111. In this case, by varying the main scanning speed and the feed amount of the sub-scanning direction, the scale reduction and magnification of an image can be attained. However, in some cases, there arise problems as shown in FIGS. 4(b) and 4(c). It is assumed here that the pitch between dots in the scale reduction and magnification modes is l' and l'', respectively. In the scale reduction mode, the dot density becomes high as shown in FIG. 4(b) so that the superposed area between dots becomes large. As a result, in some cases, the printed image becomes dirty and the original image is not reproduced faithfully in quality due to the same, large dot size. Contrary to the above, in the magnification mode, the disposal of dots becomes coarse as shown in FIG. 4(c) so that a clearance m between dots exists to thereby expose the surface of a recording paper. Therefore, in many cases, disadvantages are brought about that not only the overall density is degraded but also the original image can not be magnified with fidelity. Thus, problems still may exist if the main scanning speed and the feed amount of the sub-scanning are merely varied.

Apart from the above, in obtaining a copy of an image, generally there are two considerations; one being to copy the original quickly even if the image quality is somewhat deteriorated, and the other being to copy the original so as to obtain a good image quality irrespective of its copying speed. Furthermore, documents made of alphabetical characters for example are satisfactory even if a high quality image is not incorporated for printing the documents. However, in the case of a photographic image, if a recording apparatus of the type printing out only two logical values is used, it is necessary to employ a dither process for regenerating a half tone. In this case, because of a dither matrix, pixels for a half tone printing become coarse. In order to compensate the coarseness, it is necessary to prepare high density print dots. Although relatively coarse pixels are sufficient for usual handwriting characters, in the case of typeprinting with many thin characters, if coarse pixels are used, the recording results are hard to read. Thus, in many cases, a high density recording is required.

SUMMARY OF THE INVENTION

The present invention has been made in order to solve the above prior art problems. The present invention provides an image handling system capable of recording such images as the user desires by making it possible to change over a high speed recording and a high density recording with a simple means.

The present invention eliminates the above prior art disadvantages and provides an image handling system provided with a read-out and recording means capable of performing a variable magnification such as a scale reduction and magnification with a simple structure.

The present invention eliminates the above disadvantages and it is an object of the present invention to provide an image handling system provided with a variable magnification means with which a good image can be obtained at all times. In order to achieve the above object, the present invention provides an image handling system provided with a recording device comprising means for varying a relative movement distance or speed between a recording head and a recording material and means for varying the recording pixel area in accordance with the variation ratio set by the former means.

According to a first aspect of the invention, there is provided an image handling system with a device for rotating at least one of a recording and reading heads about an axis perpendicular to a scanning surface to vary a magnification of image.

According to a second aspect of the invention, there is provided an image handling system with a device for rotating a head in a scanning motion about an axis perpendicular to a scanning surface.

According to a third aspect of the invention, there is provided an image handling system with a device for rotating recording and reading head about an axis perpendicular to a scanning surface to be positioned at the same angle with the head moving direction.

According to a fourth aspect of the invention, there is provided an image handling system with a device for changing a relative movement speed or relative displacement distance of a recording head and a dot diameter control device responsive to the change of speed or distance of the head for changing a recording pixel area.

BRIEF DESCRIPTION OF THE DRAWINGS

FIG. 3 is a cross sectional view for explaining the structure of FIG. 2, FIGS. 4 show printed examples of a print dot group by an ink jet recording system, wherein FIGS. 5 are views illustrating the correlation between the print dot group and the orientation of the orifices of an ink jet head of the apparatus embodying the present invention, whereby FIGS. 9 show printed examples of a print dot group by an ink jet recording system, wherein FIG. 10 is a block diagram showing a control system of a device for varying a recording pixel area according to the present invention, and FIG. 11 are views for explaining the mutual relation between the print dot group and the orientation of the orifices of an ink jet head embodying the present invention, wherein

DETAILED DESCRIPTION OF PREFERRED EMBODIMENTS

Figure 5A:
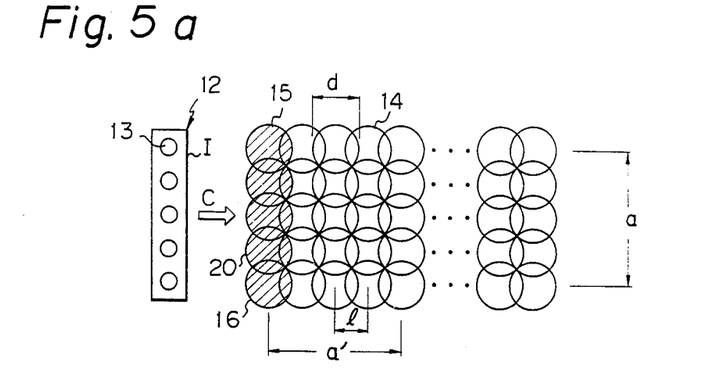
FIG. 5(a) is a view illustrating the corelation in an equal magnification recording.

Referring now to the accompanying drawings, the present invention will be described. Printing out one line along the main scanning direction by using the recording head 1 of the apparatus shown in FIG. 1 will be described with reference to FIG. 5. In FIG. 5(a), numeral 12 represents a recording section of the recording head 1. In the present embodiment, the orientation of the orifices of the ink jet head will be described. Numeral 13 represents an ink drop ejection outlet of the ink jet head, a plurality (in the embodiment, the number is five) of outlets 13 being disposed in the direction perpendicular to the main scanning direction C (i.e., parallel to the subscanning direction). By scanning the recording section 12 of the recording head in the main scanning direction C and jetting out ink drops, a printed dot group 14 is recorded having a recording width corresponding to the number of ink ejection outlets. Oblique line portions 15 through 16 in the print dot group 14 are printed out by a substantially single ejection from the recording head, the main scanning recording being performed by repetitive ejections corresponding to the recording density.

Figure 5B:
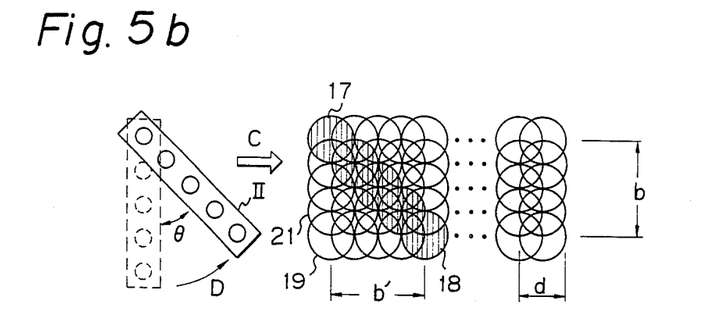
FIG. 5(b) is a view illustrating the corelation in a scale reduction recording.

FIG. 5(b) is directed to the scale reduction recording. From the position I of the recording head shown in FIG. 5(a), the recording head 1 as of FIG. 1 is rotated in an arrow direction D by the amount of angle $\theta$ relative to the main scanning direction (an arrow C direction in FIG. 5) as shown in FIG. 5(b) so as to move the recording section 12 of the recording head to the position II. By so doing, the recording width is scaled down to b as shown in the figure without changing the number of dots. The scale reduction ratio relative to the equal magnification process as of FIG. 5(a) is given by $b/a = \cos\theta$. The recording frequency of the recording head 1 (FIG. 1) in the main scanning direction is 5 dots within the distance a' of FIG. 5(a) and within the distance b' of FIG. 5(b). In effect, if the ejection frequencies of the recording ink jet head are made constant both at the equal magnification and scale reduction modes, the printed dots as shown in the figure are superposed closely so that the quality of an image will necessarily be deteriorated. Therefore, by setting the main scanning movement speed as $b'/a'$ ($=b/a$), a proper scale reduction in scanning a single line can be obtained. As to the sub-scanning, since the main scanning recording widths (i.e., recording width 10 in the sub-scanning direction) for the scale reduction and equal magnification differ from each other, it is necessary to vary the sub-scanning movement distance for a single feed in accordance with the magnification ratio. This can be met by varying the number of pulses supplied to the pulse motor 11 of the recording head shown in FIG. 1, the pulse motor 11 being used in feeding the head 1 in the sub-scanning direction. That is, the feed width in the sub-scanning direction is changed from a in the equal magnification to be in the scale reduction.

The image signal to be transferred in the equal magnification mode from a read-out head (not shown) to the recording head (FIG. 1) is input such that the oblique line portions 15 through 16 are simultaneously printed out. Therefore, if printing is carried out merely by rotating the recording section 12 of the recording head by the angle $\theta$ as shown in FIG. 5(b), the resultant printed dots present oblique line portion 17 to 18 slanted by the angle $\theta$, which should in natural be printed out in the direction perpendicular to the main scanning direction retaining the scale proportional to the oblique line portions of FIG. 5(a). In order to solve the above problem, it is necessary to delay the image signal in part. In particular, in FIG. 5(b), the signal for the dot 16 is printed out as the dot 19 without being subjected to the delay even in the scale reduction mode. Next, the signal for the dot 20 of FIG. 5(a) is printed out as the dot 21 by delaying it in the scale reduction mode by the amount of one dot. Similarly, as the delay time is gradually increased, the image signal corresponding to the dot 15 of FIG. 5(a) is printed out as the dot 17 by delaying it in the scale reduction mode by the amount of 4 dots.

Figure 5C:
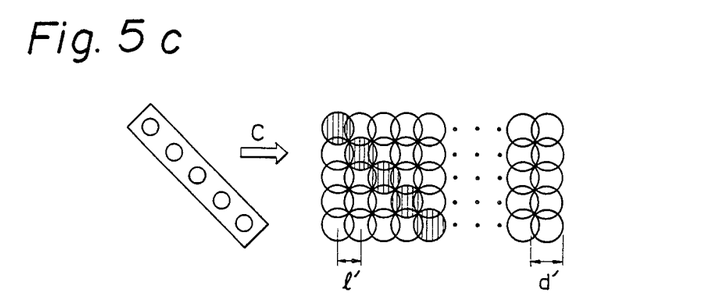
FIG. 5(c) is a view illustrating the corelation for adusting the dot diameter of an ink drop.

In order to improve the image quality in addition to the above scale reduction, it is preferable to set the dot diameter of an ink drop such that a large superposed area between printed dots such as shown in FIG. 5(b) does not occur and also any clearance between printed dots does not exist. Since $d = \sqrt{2}l$ is commonly employed as shown in FIG. 5(a), it is preferable to set as $d' = \sqrt{2}l$ as shown in FIG. 5(c) in the scale reduction mode.

Figure 6:
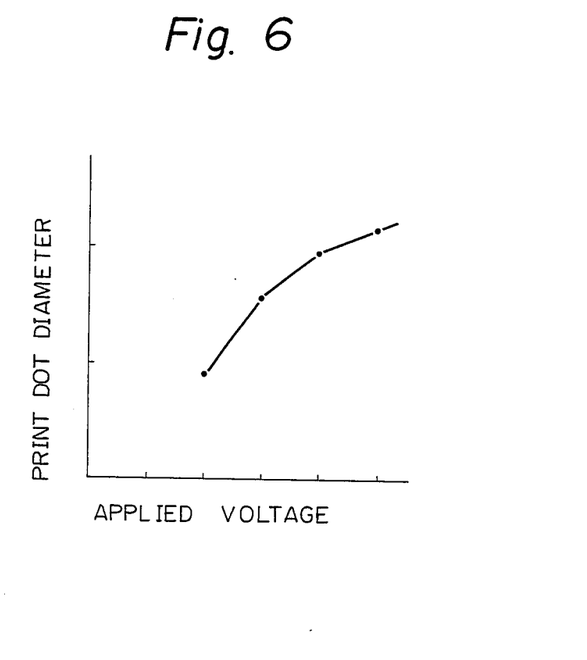
FIGS. 6 and 8 are correlation graphs between the printed dot diameter and the applied voltage to the ink jet head.

Among the control method of the printed dot diameter for practicing the above, there are known such as Kyser method (U.S. Pat. No. 3,946,398) known as an impulse-type ink jet method, Gould method (Zoltan type U.S. Pat. No. 3,683,212), and Stemme method (U.S. Pat. No. 3,747,120). In the disclosure of the above methods, a pulse voltage is applied to a piezoelectric element so as to exert a pressure to ink within an ink jet nozzle, thereby ejecting ink and forming an ink drop. By varying the voltage applied to the piezoelectric voltage, it is possible to change the amount of ejected ink drop and hence the printed dot diameter. In this case, the input voltage (horizontal axis) to the piezoelectric element and the printed dot diameter (vertical axis) are related to each other as shown in FIG. 6. With such relation, by decreasing the voltage for example, the printed dot diameter can be made small.

Another method using thermal energy for ejecting ink and forming an ink drop may be utilized, such as disclosed in German Laid-open (DOLS) Publication Nos. 2843064 and 2944005.

Figure 7:
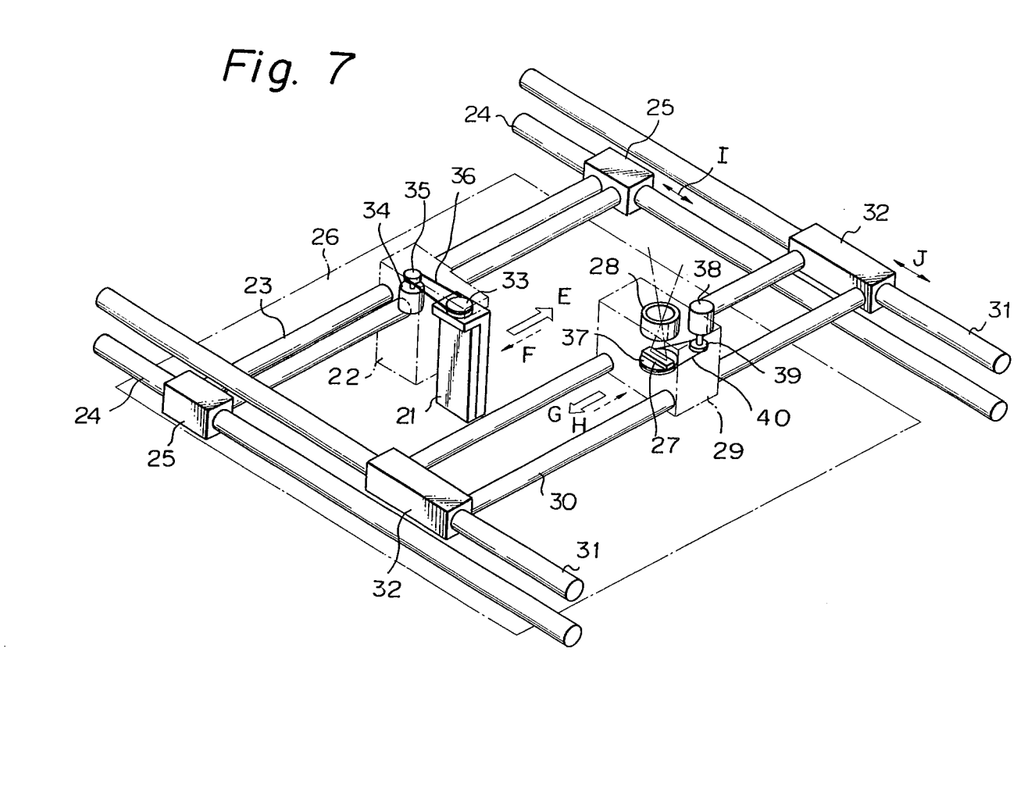
FIG. 7 is a perspective view of an embodiment of a read-out and recording device for use with an image forming apparatus according to the present invention.

The structure of a read-out and recording device of another embodiment of the apparatus according to the present invention is briefly shown in FIG. 7. First, in the read-out means, a read-out head including a read-out element 27 composed of a photoelectric conversion element such as a CCD and a focusing optical system such as a lens 28, are mounted on a read-out head carriage 29. The read-out head is moved by a not shown drive source on the read-out main scanning rail 30 in the main scanning arrow direction G, and is moved to return in the main scanning arrow direction H. The read-out head carriage 29, main scanning rail 30 and the like are moved by a sub-scanning carriage 32 sliding on a sub-scanning rail 30 in the sub-scanning arrow direction J perpendicular to the main scanning direction. Upon each one main scanning, the sub-scanning is carried out by the distance corresponding to the main scanning read-out width. Thus, the image of an original (not shown) disposed parallel to the scanning face of the read-out head and above the read-out head as seen in the drawing, is focused through a focusing lens 28 onto the read-out element 27, the focused image being output as electrical signal to a recording means described hereinunder.

A recording head 21 has at its lower portion a recording section and is mounted on a recording head carriage 22. The recording head 21 is moved by a drive source on the main scanning rail 23 in the main scanning arrow direction E similarly to the case of the read-out means, and is moved to return in the main scanning arrow direction F. The recording head carriage 22, main scanning rail, and the like are moved by a sub-scanning carriage 25 sliding on a sub-scanning rail 24 in the sub-scanning arrow direction I. Upon each main scanning, the sub-scanning is carried out by the distance corresponding to the main scanning read-out width. Therefore, by sequentially repeating the main and sub-scannings, the whole image surface of a recording paper 26 disposed beneath the recording head is printed out.

The read-out head 27 and recording head 21 of the apparatus thus constructed have the same number of plural read-out elements and recording elements respectively, both elements being disposed in correspondence relation to each other in the sub-scanning direction. Therefore, without using memory devices, the apparatus can perform read-out and recording operations. In the present embodiment, a portion of the original image focussed onto the read-out element 27 is set to have the same recording width in the main scanning direction of the recording head 21 by adjusting the lens 28.

The read-out element 27 is mounted through a rotary stand 37 on the read-out carriage 29. The rotary stand 37 is arranged rotatable about an axis perpendicular to the original surface by a predetermined angle $\theta$ with a read-out head rotation pulse motor 38 via a pulley 39 and a belt 40.

Similarly to the above, the recording head 21 is mounted through a rotary stand 33 on the recording head carriage 22. The rotary stand 33 is arranged rotatable about an axis perpendicular to a recording paper surface, i.e., about an axis parallel to the read-out head rotary axis, by a predetermined angle $\theta$ with a recording head rotation pulse motor 34 via a pulley 35 and a belt 36. With the above structure, the scale reduction of an image can easily be attained, for example, by rotating the recording head 21 by a preset angle with the recording head rotation pulse motor 34, with the read-out head 27 being fixed. Alternatively, the magnification of an image can easily be attained by rotating the read-out head 27 by a predetermined angle $\theta$.

In the above embodiment, either one of the read-out head and recording head has been made parallel to the sub-scanning direction in the respective scale reduction and magnification modes so as to simplify the description. However, the invention is not limited thereto and it is possible to attain the scale reduction of an image in a $\theta_1 > \theta_2$ condition and to attain the magnification of an image in a $\theta_1 < \theta_2$ condition, wherein $\theta_1$ is an angle between the sub-scanning direction and the orientation of the recording element array and $\theta_2$ is an angle between the sub-scanning direction and the orientation of the read-out head element array.

Futhermore, with the apparatus shown in FIG. 7, (1) in the case of a high speed copying, the read-out and recording arrays having the same number of elements are both disposed parallel to the sub-scanning direction, and (2) in the case of a high density copying, in response to a signal from a not shown change-over means such as a manual switch, the read-out and recording rotation pulse motors 38 and 34 are rotated by the preset number of pulses to thereby rotate both read-out and recording element arrays by the same angle $\theta$ relative to the sub-scanning direction. As a result, with the same number of read-out and recording dots, the main scanning read-out and recording widths are made narrower as compared with the case (1) so that a high density image can be produced.

FIG. 5(a) shows the recording position in the above high speed copying case (1). The above high density any fine copying case (2) is performed as shown in FIG. 5(b). From the position I of the recording head in the high speed recording shown in FIG. 5(a), the recording head 21 as of FIG. 7 is rotated in an arrow direction D by the amount of angle $\theta$ relative to the main scanning direction (an arrow C direction) as shown in FIG. 5(b) so as to move the recording section 1 of the recording head to the position II. By so doing, the recording width is scaled down to b as shown in the figure without changing the number of dots. Therefore, the high density variation ratio relative to the recording width (represented by a in FIG. 5(a)) in the high speed recording is given by $a/b = 1/\cos\theta$. The recording frequency of the recording head 21 in the main scanning direction corresponds to 5 dots within the distance a' in the high speed recording and within the distance b' in the high precision and fine recording. In effect, if the ejection frequencies of the recording ink jet head are made constant, the main scanning movement speed is set as $b'/a'$ ($= b/a$). By so setting, it is possible to attain a high density in the main scanning direction. As for sub-scanning, the main scanning recording width a and b for the high speed recording and the high density recording differ from each other. Therefore, the feed amount of the sub-scanning pulse motor (not shown) for the recording head shown in FIG. 7 is varied for the respective high speed and density recordings, i.e., the movement amount of the sub-scanning carriage 25 for the recording head is set at a distance a and a distance b, respectively.

On the other hand, the read-out head is operated upon in the same way as of the recording head. In this case, it can be readily understood by considering that the ink ejection outlet 13 of FIG. 5 corresponds to the photoelectric conversion element such as a CCD, and that the dot diameter for a image quality improvement means (described later) in the high density recording shown in FIG. 5(c) corresponds to an image area of an original focused onto each photoelectric conversion element.

As seen from the above, by rotating the readout head and recording head by the same angle $\theta$, it is possible to attain a high density copying although the main scanning speed is somewhat slow and the sub-scanning distance for a single feed is small as compared with the conventional high speed copying. Alternatively, by varying the angle and making the orientation of the read-out and recording element array coincide with the sub-scanning direction, it is possible to attain a high speed copying with a high main scanning speed and a large sub-scanning distance for a single feed although the dot density is not so high.

FIG. 5(c) illustrates a method for further improving the image quality in addition to the high density copying obtained similarly as in FIG. 5(b). The printed dot diameter d in the high density mode of FIG. 5(b) is the same printed dot diameter d in the high speed recording of FIG. 5(a). If the same dot diameter is used, there is a large superposed area between dots so that the image appears dirty. Furthermore, due to a large dot diameter, the original image quality can not be correctly regenerated. In such case, by making the printed dot diameter d' smaller in correspondence with the high density variation ratio, i.e., by setting as $d' = b/a$, an excellent copied image properly corresponding to an original image was obtained as shown in the figure.

Figure 8:
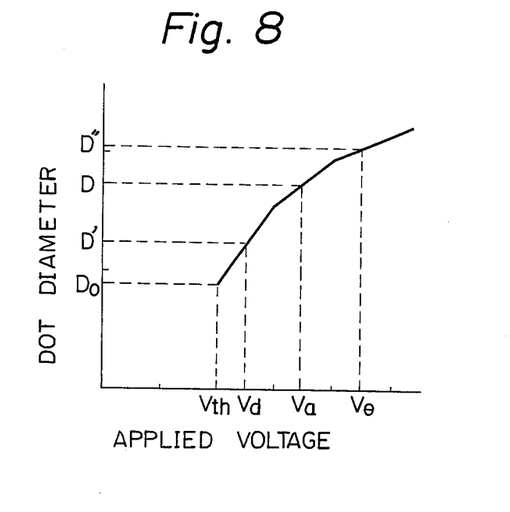

The invention will be described with reference to the accompanying drawings. As previously described with reference to FIGS. 3 and 4, the piezoelectric element 2 is energized and compressed to eject ink from the nozzle 1. In this case, the voltage applied to the piezoelectric element 2 is changed to vary the ejection ink amount. The relation between the voltage and the ink amount is generally shown in FIG. 8, wherein the horizontal axis indicates the applied voltage to the piezoelectric element 2 and the vertical axis indicates the printed dot diameter. In the figure, from the left to the right, if the voltage is raised, ink ejection starts at a threshold value Vth. It is seen that as the voltage rises, the dot diameter becomes larger.

In the present invention utilizing the above characteristic relation, the voltage to be applied to the piezoelectric element 2 is varied in the scale reduction and magnification modes so as to arrange to obtain a dot diameter corresponding a selected magnification ratio.

Figure 9A:
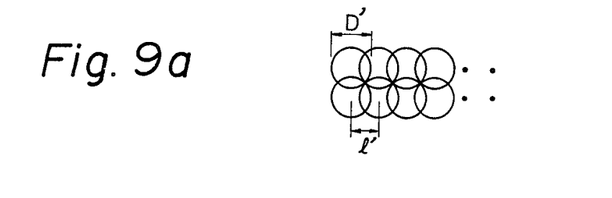
FIGS. 9(a) and 9(b) are views for explaining the print disposal in the scale reduction and magnification operations according to the present invention, respectively.
Figure 9B:
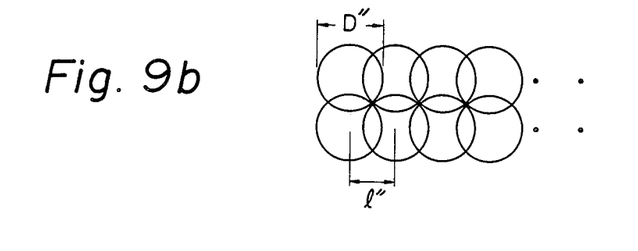

Examples of properly variable-magnified images obtained by controlling the applied voltage basing upon the above concept in the present invention are shown in FIGS. 9(a) and 9(b). FIG. 9(a) shows an example obtained by performing the main and sub-scannings with the same scale reduction ratio as of (I) in FIG. 9, wherein the dot pitch is l' identical to (I) of FIG. 9. In this case, the dot diameter $D' = \sqrt{2} l'$ which is suitable for obtaining a pattern with no clearance between dots. For example, if the applied voltage is Va for the dot diameter D of FIG. 4(a), then the most suitable dot diameter D' in the scale reduction mode is given by Vd. FIG. 9(b) shows an example obtained in the same magnification ratio as of FIG. 4(c). The dot pitches are "l" and in this case a suitable dot diameter $D'' = \sqrt{2} l''$ which makes no clearance between dots. The dot diameter is obtained with an applied voltage Ve.

Figure 10:
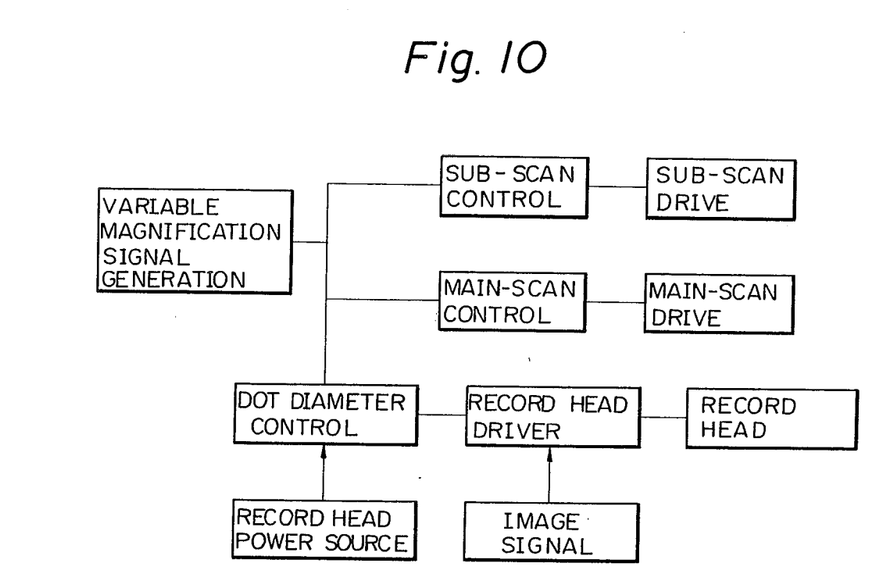

As seen from the above description, basing upon a characteristic applied-voltage/dot-diameter diagram of a particular ink jet print system, the dot diameter control means is operated in response to a magnification ratio to vary the main and sub-scanning feeds, i.e., the recording pixel area (refer to FIG. 10). Thus, an excellent magnified image can be obtained.

The embodiment of the apparatus according to the present invention was practiced using the previously described read-out and recording device shown in FIG. 7.

Figure 11A:
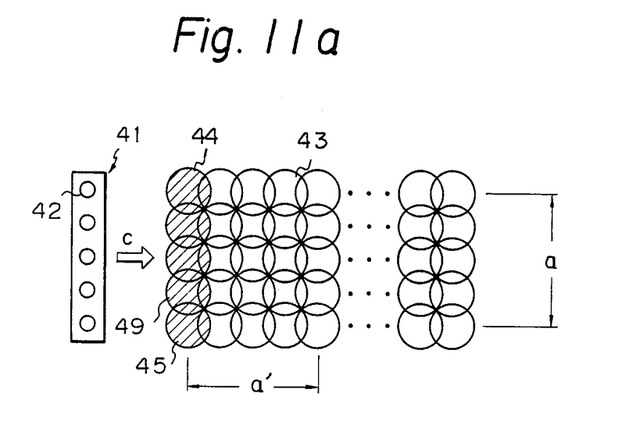
FIG. 11(a) is a view for explaining the equal magnification copying and FIG. 11(b) is a view for explaining the scale reduction copying.

Printing out one line along the main scanning direction by using the recording head 21 in the structure shown in FIG. 7 will be described with reference to FIG. 11. In FIG. 11(a), numeral 41 represents a recording section of the recording head. In the present embodiment, the orientation of the orifices of the ink jet head will be described. Numeral 42 represents an ink drop ejection outlet of the ink jet head, a plurality (in the embodiment, the number is five) of outlets 42 are disposed in the direction perpendicular to the main scanning direction C (i.e., parallel to the sub-scanning direction). By scanning the recording section 41 of the recording head in the main scanning direction C and jetting out ink drops, a print dot group 43 is recorded having a recording width corresponding to the number of ink ejection outlets. Oblique line portions 44 through 45 in the printed dot group 43 are printed out by a substantially single ejection from the recording head, the main scanning recording being performed by repetitive ejections corresponding to the recording density.

Figure 11B:
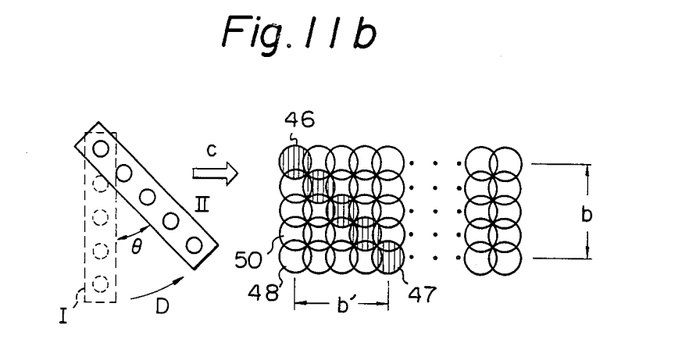

FIG. 11(b) is directed to the scale reduction recording. From the position I of the recording head shown in FIG. 11(a), the recording head 21 as of FIG. 7 is rotated in an arrow direction D by the amount of angle θ relative to the main scanning direction (an arrow C direction in FIG. 5) as shown in FIG. 5(b) so as to move the recording section 41 of the recording head to the position II. By so doing, the recording width is scaled down to b as shown in the figure without changing the number of dots. The scale reduction ratio relative to the equal magnification process as of FIG. 11(a) is given by $b/a = \cos \theta$. The recording frequency of the recording head 21 (FIG. 7) in the main scanning direction is 5 dots within the distance a' of FIG. 11(a) and within the distance b' of FIG. 11(b). In effect, if the ejection frequencies of the recording ink jet head are made constant both at the equal magnification and scale reduction modes, the printed dots as shown in the figure are superposed closely so that the quality of an image necessarily be deteriorated. Therefore, by setting the main scanning movement speed as b'/a' (=b/a), a proper scale reduction in scanning a single line was obtained. As to the sub-scanning, since the main scanning recording widths (i.e., recording width in the sub-scanning direction) for the scale reduction and equal magnification differ from each other, it is necessary to vary the sub-scanning movement distance for a single feed in accordance with the magnification ratio. This was carried out by varying the number of pulses supplied to the pulse motor (not shown) of the recording head 21 shown in FIG. 7, the pulse motor being used in feeding the head 21 in the sub-scanning direction. That is, the feed width in the sub-scanning direction is changed from a in the equal magnification to be in the scale reduction.

The image signal to be transferred in the equal magnification mode from a read-out head 27 to the recording head 21 (FIG. 7) is input such that the oblique line portions 44 through 45 are simultaneously printed out. Therefore, if printing is carried out merely by rotating the recording head 21 of the recording head by the angle θ as shown in FIG. 11(b), the resultant printed dots present oblique line portions 46 to 47 slanted by the angle θ, which should in natural be printed out in the direction perpendicular to the main scanning direction retaining the scale proportional to the oblique line portions of FIG. 11(a). In order to solve the above problems, it is necessary to delay the image signal in part. In particular, in FIG. 11(b), the signal for the dot 45 is printed out as the dot 48 without being subjected to the delay even in the scale reduction mode. Next, the signal for the dot 49 of FIG. 11(a) is printed out as the dot 50 by delaying it in the scale reduction mode by the amount of one dot. Similarly, as the delay time is gradually increased, the image signal corresponding to the dot 44 of FIG. 11(a) was printed out as the dot 46 by delaying it in the scale reduction mode by the amount of 4 dots.

Furthermore, in this case, as described previously, by setting the print dot diameter as a proper dot diameter of $d' = b/a \times d$, an excellent image quality was obtained.

In the above embodiment, although the recording head has been described by using an ink jet unit, recording methods such as thermal recording and thermal transfer recording were also applicable by using a thermal head.

As seen from the above detailed description of the variable image-magnifying apparatus of the present invention with the above described construction and operation, it is advantageous in that a variable image-magnifying function with a very excellent quality can be obtained by simple information processing for a rotary motion of the read-out device and/or recording device by a predetermined angle about an axis perpendicular to a read-out object and/or recording object.

Further, according to the present invention, it is possible to provide an image forming apparatus which presents a distinguishable effects in recording the original pixel area in a magnified form with ease and fidelity, and making the movement distance of speed of the means for moving a recording head relative to a recording material correspond to a desired magnification ratio, and by making the print dot shape suitable for the magnification ratio.

In addition, according to the present invention, the very simple manipulation can suffice to obtain a proper operation. Therefore, a proper recording pixel desired by the user can be obtained by changing over the high speed recording and the plural kinds of high density recordings in accordance with the nature of an original. Furthermore, the image quality can be improved by additionally using the image quality improvement means.

What we claim is:

1. An image handling system comprising:
   a recording head having a plurality of recording elements for recording an image composed of pixels on a scanning surface, wherein said recording head is capable of changing the area of the pixels,
   a reading head having a plurality of reading elements for reading a scanning surface and providing an image signal to said recording head,
   means for moving relative to and in parallel with the scanning surfaces said recording head and said reading head,
   means for rotating at least one of said recording head and said reading head about axes perpendicular to the scanning surfaces to vary the magnification of the image recorded by said recording head, and
   dot diameter control means for controlling said recording head to change the areas of the pixels as the magnification of the recorded image is varied.

2. An image handling system according to claim 1, wherein said head to be rotated is said recording head.

3. An image handling system according to claim 2, wherein said recording head includes an ink jet head.

4. An image handling system according to claim 3, wherein said ink jet head is a impulse type ink jet.

5. An image handling system according to claim 2, wherein said recording head includes a thermal head.

6. An image handling system according to claim 1, wherein said head to be rotated is said reading head.

7. An image handling system according to claim 3, wherein said reading head includes an optical imaging system.

8. An image handling system according to claim 1, wherein both of said heads are to be rotated.

9. An image handling system comprising:
   a recording head having a plurality of recording elements for recording an image composed of pixels on a scanning surface, wherein said recording head is capable of changing the area of the pixels,
   a reading head having a plurality of reading elements for reading a scanning surface and providing an image signal to said recording head,
   means for moving relative to and in parallel with the scanning surfaces said recording head and said reading head,
   means for selectively rotating said recording head and said reading head about axes prependicular to the scanning surfaces to vary the magnification of the image recorded by said recording head, and
   dot diameter control means for controlling said recording head to change the areas of the pixels area as the magnification of the recorded image is varied in accordance with the amount of rotation of said heads.

10. An image handling system according to claim 9, wherein said head to be rotated in said recording head.

11. An image handling system according to claim 10, wherein said recording head includes an ink jet head.

12. An image handling system according to claim 11, wherein said ink jet head is a impulse type ink jet.

13. An image handling system according to claim 10, wherein said recording head includes a thermal head.

14. An image handling system according to claim 9, wherein said head to be rotated is said reading head.

15. An image handling system according to claim 14, wherein said reading head includes an optical imaging system.

16. An image handling system according to claim 9, wherein both of said heads are to be rotated.

17. An image handling system comprising:
   a recording head having a plurality of recording elements arranged in a row for recording an image on a scanning surface,
   a reading head having a plurality of reading elements arranged in a row for reading a scanning surface and providing an image signal to said recording head,
   means for moving relative to and in parallel with the scanning surfaces said recording head and said reading head, and
   means for rotating said recording and reading heads about axes perpendicular to the scanning surfaces so that said rows of said recording and reading elements are positioned at the same angle with respect to the direction of relative motion of said heads and the scanning surfaces.

18. An image handling system according to claim 17, wherein said recording head includes an ink jet head.

19. An image handling system according to claim 18, wherein said ink jet head is an impulse type ink jet.

20. An image handling system according to claim 17, wherein said recording head includes a thermal head.

21. An image handling system according to claim 17, wherein said reading head includes an optical imaging system.

22. An image handling system according to claim 17, wherein the size of a picture element recorded by said recording head is changed in accordance with the angle provided by said means for rotating.

23. An image handling system according to claim 17, wherein said means for rotating includes a pulse motor.

24. An image handling system according to claim 17, wherein the angle is changed by a signal from switch-over means.

25. An image handling system according to claim 17, wherein at least two angles are selectable.

26. An image system comprising:
   a recording head having at least one recording element for recording an image composed of pixels on a scanning surface, wherein said recording head is capable of changing the diameter of the pixels to vary the area thereof,
   means for moving said recording head relative to a scanning surface to record an image line,
   means for changing the relative movement speed or relative displacement distance of said recording head, and
   dot diameter control means responsive to the change of relative movement speed or relative displacement distance for controlling said recording head to change the area of a pixel such that the pixel area satisfies the following relation:

$$d' = b/a \cdot d$$

where d is the pixel diameter and a is the recording width of an image line in an equi-magnification mode, and d' is the pixel diameter and b is the recording width of an image line in a reduction mode.

* * * * *